United States Patent [19]

Makara

[11] Patent Number: 4,691,472
[45] Date of Patent: Sep. 8, 1987

[54] PROCESS FOR REARING AND TRANSPORTING ARRANGEMENTS OF EPIPHYTIC PLANTS

[75] Inventor: György Makara, Budapest, Hungary

[73] Assignee: Innovator Mernok Kisszovetkezet, Budapest, Hungary

[21] Appl. No.: 740,842

[22] PCT Filed: Aug. 24, 1984

[86] PCT No.: PCT/HU84/00043
§ 371 Date: Apr. 24, 1985
§ 102(e) Date: Apr. 24, 1985

[87] PCT Pub. No.: WO85/00953
PCT Pub. Date: Mar. 14, 1985

[30] Foreign Application Priority Data

Aug. 25, 1983 [HU] Hungary .............................. 3004/83
Feb. 8, 1984 [HU] Hungary .............................. 3004/83

[51] Int. Cl.$^4$ .............................................. A01G 9/00
[52] U.S. Cl. ............................................. 47/58; 47/17
[58] Field of Search ...................................... 47/58, 17

[56] References Cited

U.S. PATENT DOCUMENTS 4,138,802 2/1979 Weisner .................................. 47/58

OTHER PUBLICATIONS

Art and Craft of Growing Orchids, Bowen, 1977, Batsford Ltd, London, pp. 40–41.
Home Orchid Growing, 3rd Ed., Northen, 1977, Van Nostrand Reinhold, N.Y., p. 342.
Exotica 4, Graf, 1982, Roehrs Co., N.J., pp. 561 and 589.

Primary Examiner—Robert E. Bagwill
Attorney, Agent, or Firm—Young & Thompson

[57] ABSTRACT

Precultivated epiphytes, as well as derivatives of these are used in the usual manner for the artificial cultivation of epiphytes, in particular orchids as well as hybrids and/or intergeneric derivatives of these. Within the concept of the invention the precultivated epiphytes or the derivatives of these are brought into a permanent biological union with the bark of a live host tree which is several years old and forms lignified bark (that can originate from a geographical area other than that of the epiphytes). If necessary at least that portion of the host tree that is used for creation of the biological union is kept, at least temporarily, in a controlled climate, and the plant arrangement created in this manner is kept alive in toto and used subsequently either in whole or in part.

The floral arrangements that contain the epiphytes, particularly orchids, or the hybrids and/or intergeneric derivatives of these are developed, according to the present invention, to the point that the epiphytes or the derivatives of these are settled by means of a permanent biological bond on the bark of a live host tree which is several years old and forms lignified bark and the floral arrangement can move at least temporarily from its location. The epiphytes or the derivatives of these are transported to their destination by a known transportation procedure. This procedure is developed to the point that for purposes of transportation epiphytes or the derivatives of these that form a permanent biological union with the bark of a live host tree which is several years old and forms lignified bark are used. The union is formed, if necessary, prior to transportation and the resulting floral arrangement is then transported.

4 Claims, 6 Drawing Figures

PROCESS FOR REARING AND TRANSPORTING ARRANGEMENTS OF EPIPHYTIC PLANTS

The present invention relates to a method for the artificial rearing of epiphytes, particularly orchids, as well as hybrids and/or intergeneric derivatives of these, by using previously cultivated epiphytes or derivatives of these. In addition, the present invention relates to floral arrangements made up with the help of epiphytes, particularly orchids as well as their hybrids and/or intergeneric derivatives of the same. Finally, the present invention relates to a process used to transport the previously cultivated epiphytes, particularly orchids, as well as hybrids and/or intergeneric derivatives of these to their destinations.

Subsequently, in the description of the invention, the term epiphyte will be used in the sense of tree-dwelling plants. Central to this invention, among the tree-dwelling plants, are the orchids; however, other epiphytes and their hybrids or intergeneric derivatives are among the objects of the invention.

STATE OF THE ART

When epiphytes are reared artificially they are set in various mixtures of planting media where they then take root. The mixed planting media are composed of the bark of American conifers, fern roots and fibres, wood charcoal, plastic, lava and other components. The epiphytes can then be arranged in the most varied fashions, e.g., in perforated planter pots, plastic baskets, nets, baskets woven from wooden strips, set on the table, or even suspended from a plastic surface.

Such artificial rearing of epiphytes entails not only the disadvantage that the planting medium, or substrate, is difficult to produce and its components difficult to obtain, but it also entails the disadvantage that the epiphytes that are bedded in the substrate must be replanted every year and the substrate replaced. When such replanting takes place, the roots are damaged and start to rot. This causes considerable setback in the development and blooming vigour of the plants. From this it follows that the replanting that is required on a regular basis is both cost and labour intensive and entails considerable disadvantages from the point of view of the plants. Furthermore, it has been shown that there are many beautiful epiphytes that even when cared for most carefully and the finest substratum is used can only be kept alive artificially for a brief period, or sometimes not at all. It is a generally well-known fact that of the epiphytic orchids themselves only approximately one-third can be kept alive in an artificial substrate. Accordingly, it must be acknowledged that up to the present the problem of rearing and maintaining epiphytes artificially has not been solved satisfactorily.

The same must be said regarding the transportation of epiphytes. It is obvious that the solution is to move the artificially raised epiphytes together with the substrate in which they have put down roots. However, counter to this is the fact that for reasons of plant protection, plant substrates or root balls and the plants in them cannot be moved across the borders of most countries either under no circumstances or only in compliance with the strictest of regulations. Naturally, the epiphytes that cannot be kept alive in artificial substrata can thus not be transported.

But not even the problem of transporting epiphytes grown naturally in their proper habitat has been solved. In the tropics, epiphytes take root in tropical trees. It is, of course, impossible to move these trees and for this reason the epiphytes must be separated from them. On separation, the epiphytes get damaged and this complicates the problem of moving them and, sometimes, even renders it impossible. The plants grow weaker during a move, and many of them die. When epiphytes that have grown in the tropics are to be moved, transportation over great distances is involved, for very often the place of sale and final disposal are located in an area with a non-tropical, for example, a temperate, climate.

Up to now, an increase in aesthetic appeal was frequently the exclusive motive for putting floral arrangements together, for when ornamental plants are raised and evaluated two of the most important factors are pleasing appearance and novelty. Very frequently, in exhibitions and in botanical gardens, one can see that the epiphytes that are in artificial substrata are mostly hung from dead or live trees, this being done to increase the aesthetic effect. However, the effect that is achieved thereby is greatly reduced by the fact that the equipment used to hang the plants, and the artificial substrate cannot be hidden from view. In addition, the epiphytes are burdened even more by such treatment, and this is an even greater detriment to them.

In connection with the artificial rearing and maintenance of epiphytes, the generally, known fact that shoot formation is of especial importance to their proliferation must also be recognised. Many coloured leaf and bloom variants can only be continued by this method since succeeding generations cultivated from seeds loose the characteristics of the mother plants. Furthermore, many special hybrids are incapable of pollination and seed production; they are sterile, and can only by propagated by vegetative methods. Very often, rooting shoots in artificial planting substrate poses an insoluble problem, and this is a considerable obstacle to artificial propagation.

DESCRIPTION OF THE INVENTION

In accordance with the above, it was the task of the present invention to develop a process for the artificial cultivation or transportation of epiphytes, particularly orchids, as well as hybrids and/or intergeneric derivatives of these, said process not displaying the disadvantages found in previously applied solutions, and by means of which the circle epiphytes amenable to artificial cultivation and transportation can be made significantly greater, and the associated costs reduced. The process is to be simple and usable under any climatic conditions.

In addition, it is the task of the present invention to configure floral arrangements in which a considerably wider circle of epiphytes, particularly orchids or hybrids of these and/or intergeneric derivatives can be used, said circle being considerably greater than was formerly the case. The configured floral arrangement is novel, of great artistic worth, and in addition is more in keeping with the biological characteristics of epiphytes.

The fundamental knowledge that the difficulties encountered in the artificial raising and transportation of epiphytes, and which the problems associated with floral arrangements made up of epiphytes which have a common root contributed to the solution of this complex and complicated task; as opposed to their natural living conditions, epiphytes that are cultivated and maintained in an artificially created environment are not situated in trees.

The further development, according to the present invention, of the process as it applies to the artificial rearing of epiphytes, particularly orchids, or hybrids and/or intergeneric derivatives of these consists in the fact that previously cultivated epiphytes or derivatives of these are placed in permanent biological contact with the bark of a live host tree which is several years old and forms a lignified bark, and maintains at least that portion of the host tree that is used to form the biological connection, at least temporarily, in a climate controlled area, and thereby produces a group of plants (floral arrangement) that is connected at the roots and keeps this alive and continues to use it either in whole or in part. In another case, one can proceed so that, the precultivated epiphytes or derivatives of these are placed in permanent biological contact with a host tree that originates from a geographical area other than their natural habitat and thereby produces a group of plants that is several years old and connected at the roots and keeps this alive in toto and uses it in whole or in part. The greatest significance of this solution lies in the fact that the living conditions for the epiphytes are improved considerably. The bark of the host tree and the decomposition products from the bark supply the epiphytes with substances that cannot be replaced by artificial substitutes. The runoff water that flows down from the crown of the tree and along the bark is the optimum for the epiphytes with regard to composition, pH value, and oxygen content; it is enriched by nutrients and for this reason in an ideal culture medium for the epiphytes. In this way, too, the assimilating ends of the roots, which are active in light and the air roots that cover the remaining portions of the roots and store moisture are free and can function unhindered. In this way, it is possible to maintain, artificially, epiphytes that could not be kept alive under other artificial conditions.

In a preferred embodiment of the process according to the present invention the permanent biological connection is formed by the roots of the epiphytes or derivatives of these and by the fungi that live in the roots with these. One can simply let the epiphytes or the derivatives of these take root on the bark of the host tree. In this regard, it is expedient to control, at least in sections, the root growth rate of the host tree, or the growth rate of its trunk, its branches and/or its crown.

Of great importance is another embodiment of the process in which the host tree is moved temporarily, or made portable, during the cultivation and maintenance of the epiphytes.

The epiphytes or the derivatives of these can be subjected to chemical, microbiological and/or physical manipulation during artificial cultivation. Treatment of the roots is particularly advantageous; however, the host tree, and particularly its bark, can also be treated. Such treatment is carried out before and/or during the formation of the floral arrangement. Manipulation is here taken to mean at least one of the following types of treatment: hormone treatment, chemical treatment to stimulate growth, development, root formation, and root growth rate, application of the fungi that live with the epiphytes, and irradiation having various effects with regard to plant biology.

The further development of the floral arrangement, according to the present invention, now lies in the fact that the epiphytes or the derivatives of these are arranged on the bark of a live tree which is several year old that forms a lignified bark by a biological connection that joins the epiphytes to the host tree permanently and in that the floral arangement is such that it is portable, at least temporarily. In this regard, it is extremely important that the living conditions for the epiphytes are greatly improved in this manner. Portability is important with regard to various possibilities of arrangement and the variability of the floral arrangement.

Preferred is a version of the floral arrangement according to the present arrangement in which the permanent biological connection between the bark of the host tree and the epiphytes is formed by the roots of the latter and the fungi that live in said roots. The host tree can be an espalier tree, a dwarf tree, a piece of wood, a shrub, or a lignified decorative plant with a live bark, or a part of the foregoing. The host tree can also be a plant which is several years old that can be cultivated in a planter; in such a case it is expedient that the floral arrangement that is created from such a plant and the epiphytes or the derivatives of the same are protected in part by a protective covering made of transluscent material.

A floral arrangement has also been created in which the epiphytes or the derivatives of these are arranged by a permanent biological connection on a several year old live tree that forms a lignified bark and originates from the temperate or cold zone and has grown in the ground, a controlled climate being formed at least around this part of the trunk.

Further development according to the present invention also permits the creation of floral arrangments in which a system of columns is created from the host trees for the commercial cultivation of epiphytes or the derivatives of these, the epiphytes or their derivatives being arranged on these vertical columns by means of a permanent biological connection, whereas arrangements of lower plants or other plants are provided in the spaces between these columns. It is preferred that the spaces between the columns can be varied.

As far as transporting epiphytes, particularly orchids, as well as hybrids and/or intergeneric derivatives of these is concerned, further development according to the present invention is now seen in the fact that for transportation epiphytes or derivatives of these are used, these being permanently connected biologically with the bark of a live host tree, several years old, which forms a lignified bark, and in that if necessary the permanent biological connection is formed prior to transportation and the floral arrangement so formed is then moved. The greatest significance of this solution lies in the fact that neither plant substrate nor root ball are needed, the epiphytes do not require transplanting, their naturally formed epiphytic root connections do not have to be forcibly torn, and they are kept supplied with nutrients during the move.

According to a preferred embodiment of this process, the floral arrangment is created with the help of the roots of the epiphytes or the derivatives of this or by means of the fungi that live in the roots of the epiphytes and together with these and/or by being grown in situ and/or by replanting. A rooted host tree can also be used for transportation. However, the floral arrangement can also be applied to the bark of an easily rootable host tree and only that part of the host tree used for the creation of the floral arrangement then used for transportation.

BRIEF DESCRIPTION OF THE DRAWINGS

The present invention is described in greater detail below on the basis of exemplary versions and forms shown in the drawings appended hereto. These drawings are as follows.

THE BEST VERSION OF THE INVENTION AS CLAIMED

In the exemplary versions and the examples reference is made to orchids as representatives of the epiphytes and the hybrids and intergeneric derivatives of these, this being done for the sake of simplicity. However, no restriction is in effect that could limit application of the present invention to orchids. The latter can be replaced by any epiphytes or hybrids and intergeneric derivatives of the same.

Figure 1:
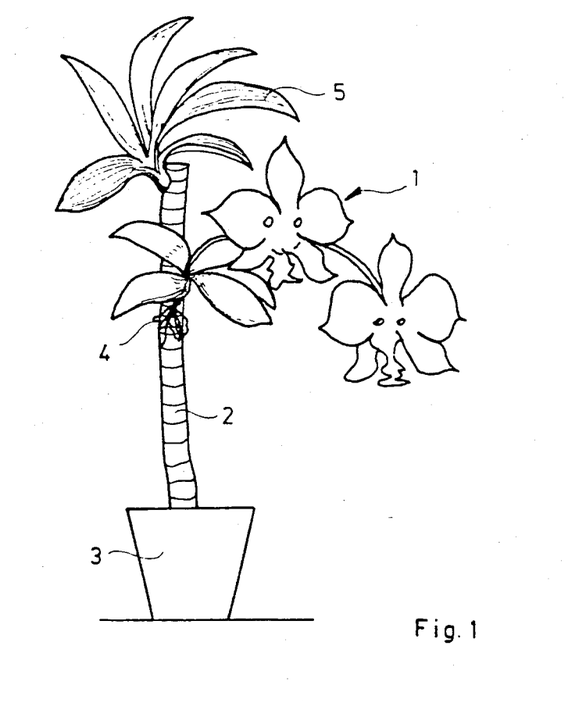
FIG. 1 shows a schematic side view of an effective version of the floral arrangement according to the present invention.

As can be seen in FIG. 1, an orchid 1 is arranged on a host tree 2. The host tree 2 is a plant, several years old live tree that forms a lignified bark. The orchid arranged thereon is a precultivated plant. In this particular arrangement, the host tree 2 is arranged in a planter 3.

As is foreseen by the underlying concept of the invention, there is a permanent biological connections between the orchid 1 and the bark of the host tree 2, in that the roots 4 of the orchid 1 are rooted onto the bark of the host tree 2.

Like the roots of epiphytes in general, the roots 4 of the orchid 1 also need air and oxygen. The roots 4 that adhere to the bark of the host tree 2 are capable of assimilation and because of a layer that covers them they do not dry out and this ensures the attachment of the orchid and its maintenance in a suitable direction. During the assimilation process water and nutrient metabolism takes place and the enzymes of the orchid 1 and the host tree 2 play equal parts in this. The bark of the host tree 2 and the decomposition by-products from it supply irreplacable nutrients to the roots of the orchid 1 artificially. The runoff water that falls from the crown 5 of the host tree and then flows along the bark is well-suited to the orchid 1 as far as its composition, pH value, and oxygen content are concerned. The water is enriched with nutrients that are used by the roots 4. It is plain that what is involved here is not a parasitic arrangement, but synergy.

Figure 2:
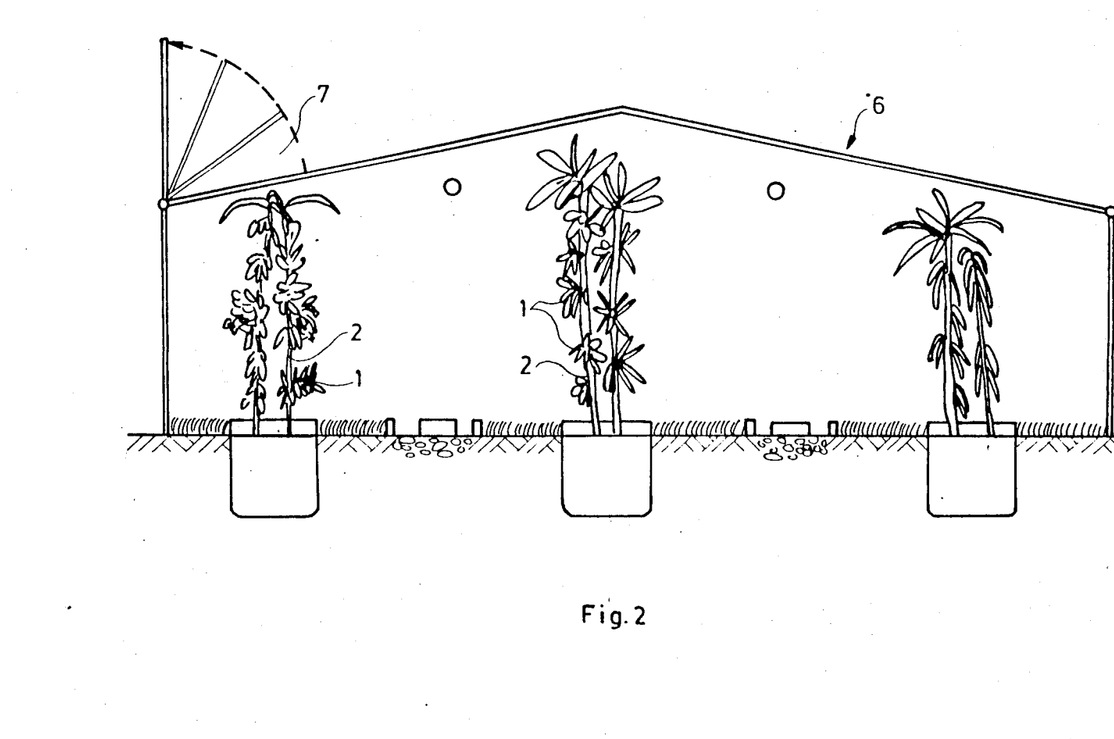
FIG. 2 is a side view, in partial cross-section, of a further version in a hot house.

As has already been discussed, the only condition to be met with regard to the host tree 2 is that it must be a mature plant with a lignified bark. Accordingly, a large number of variations is available for making up floral arrangements consisting of the orchid 1 and the host tree 2. In the case that is illustrated in FIG. 2, cultivation takes place in an area whose climate is cooler than that in the tropics, although the host tree 2 is a tropical plant of a type that originates in the natural habitat of the orchid 1. As a consequence of this both the host tree 2 and the orchid 1 that is rooted in it must be kept in a climate-controlled area, in this case a hot house 6. The host trees are arranged and raised in a conventional manner, and the orchids are permanently connected biologically to the bark of the host tree 2. The hot house 6 is provided with all the necessary equipment and fittings such as an opening roof 7, ventilation, heating, water, and nutrient supply systems.

Figure 3:
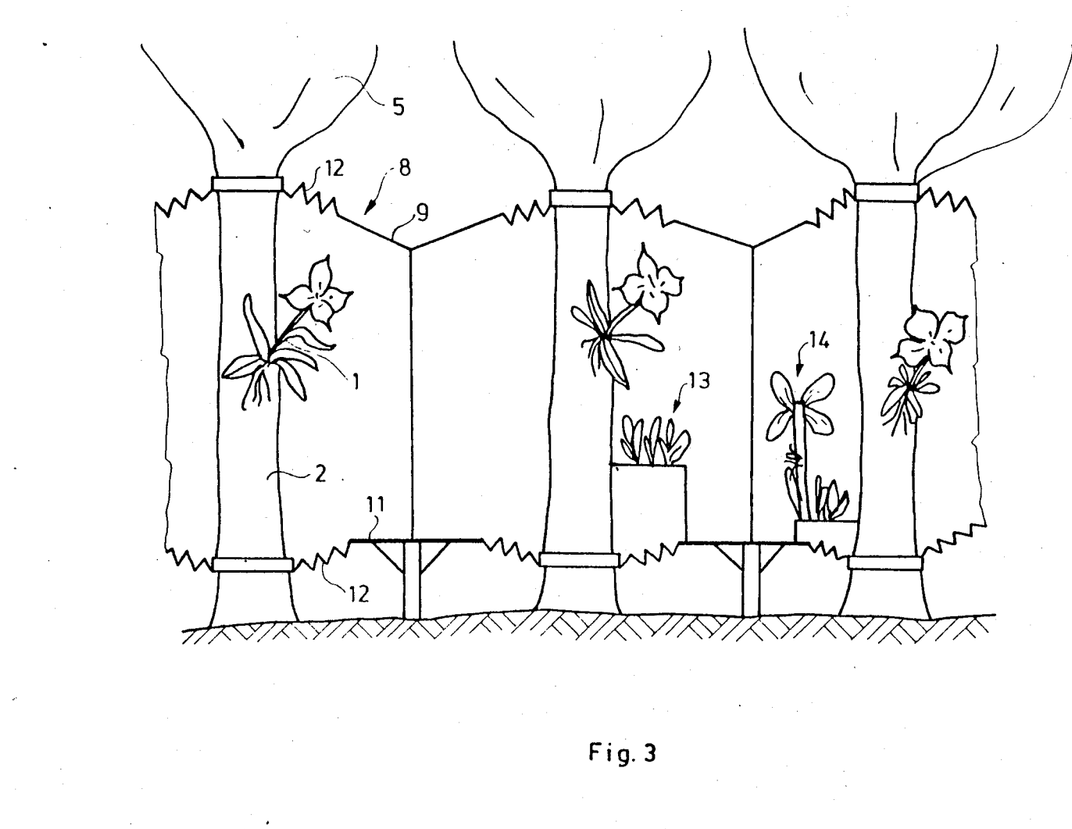
FIG. 3 is a further version in side view.

FIG. 3 also shows an example for cultivation in a climate that is cooler than the tropics. Here, however, all that there is in the climate controlled area is that portion of the host tree 2 which is used in the creation of the floral arrangement. To this end, a hot house 8 that leaves the root environment of the host tree 2 and its crown free is provided. There is a flexible connection between the trunk of the host tree 2 and the roof 9 and the base 11 of the hot house. On the one hand, this permits the unrestricted movement of the host tree against the hot house 8 and on the other ensures the maintenance of the controlled climate. The inside dimensions of the hot house 8 can be so selected that one can move on the floor 11 of the hot house 8 between the host trees 2. If one uses a row of trees to this end the trees that stand adjacent to each other can form the host trees 2 for a row of columns of orchids which can be arranged in the greatest variety of numbers and ways on the trunks of the host trees 2 as on vertical columns. A system of columns producing an extremely attractive aesthetic effect that is most pleasing to the eye can be produced from the host trees 2 that bear the orchids 1.

The open spaces between the columns of the column system formed by the host trees 2 in the interior of the hot house 8 can be used for setting up additional floral arrangements. These can be low plant arrangements or plants 14 that are otherwise usual in hot houses. By this means it is possible, on the one hand, to cover up constructional elements of the hot house, namely, the connection 12 between the host tree 2 and the base 11 and, on the other, to create a plant environment that creates an illusion of the tropics.

Figure 4:
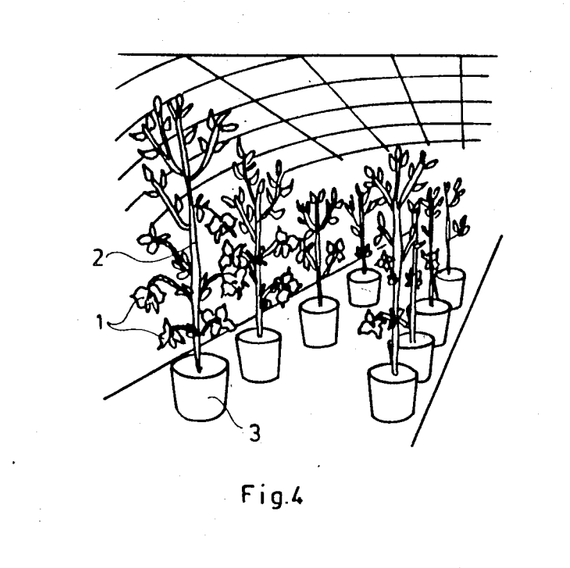
FIG. 4 is a perspective view of a further version.

FIG. 4 shows host trees 2 in planters 3, the orchids 1 being arranged on these host trees. The perspective view provides a good idea of the system of columns formed by the host trees. The spaces between the planters 3 or the host trees 2 can be used for setting out additional plants or floral arrangements.

Figure 5:
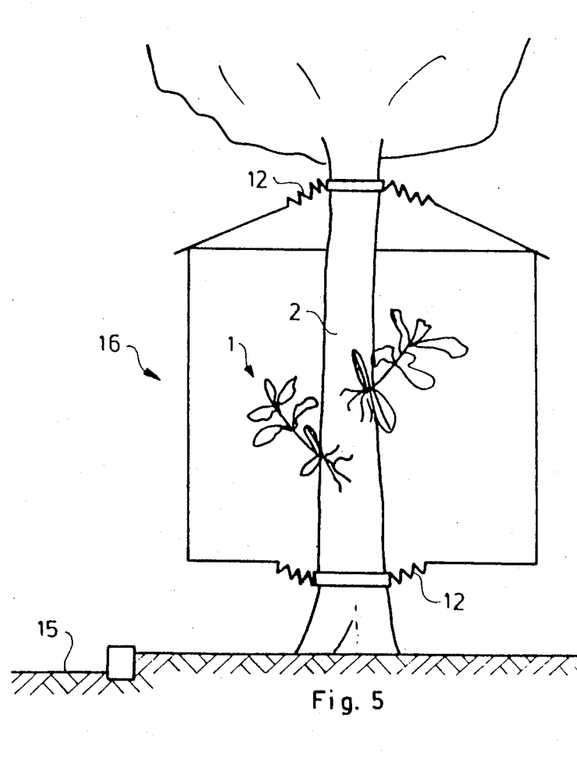
FIG. 5 shows a side view of another version in partial cross-section.

FIG. 5 shows a further possibility for the floral arrangement or the climate controlled area. The host trees 2 are arranged along a walkway 15, and the climate controlled areas are formed by hot houses 16, each of which surrounds a host tree 2. The visitor does not enter these small hot houses 16, but moves along the walkway 15 to view the orchids 1 arranged in the hot houses 16 which are arranged on the trunks of the host trees 2. Here, too, flexible connections are required between the hot house 16 and the host tree 2, as are the usual fittings for artificial lighting, heating, ventilation, and the like.

Figure 6:
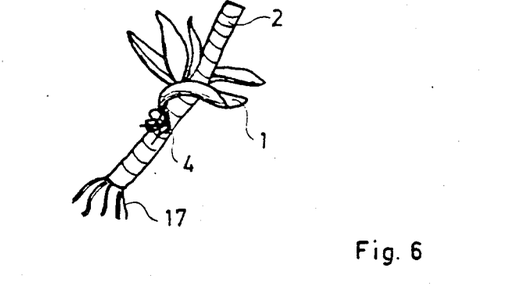
FIG. 6 is a version as prepared for transportation.

FIG. 6 shows a small section of the host tree 2 that is covered by a lignified bark, and the orchid 1 is permanently connected biologically to this section through its roots 4. This section of the host tree 2 has roots 17, which in this illustration points to the fact that the host tree 2 used here provides for good rooting and is alive at this section.

As is clear from the above discussion, the underlying concept of the present invention lies in the fact that a permanent biological union is to be created between two kinds of plant life, namely the epiphytes or its derivatives (in the examples, the orchid 1) and the host tree 2. This constitutes a biological pairing for which the two plant types must first be selected. Then, at certain places on the trunk of a live host tree 2 that is several years old and forms a lignified bark a specific number of orchids 1 are to be arranged provisionally such that their roots 4 are in contact with the bark of the host tree 2. The provisionally attached orchids 1 are kept watered and sprayed. In this way, within several weeks or at most months root formation, epiphytism, takes place. During this time, or optionally after the formation of the root union the floral arrangement or the orchid 1 or the host tree 2, the roots 4 of the bark of the host tree 2 can be subjected to chemical, microbiological, and/or physical manipulation. What is meant by this is, in the first place, hormone treatments, treatment to stimulate growth, development, root formation, or root growth, the application of those kinds of fungi that live with the epiphytes, and irradiation to achieve various effects in the realm of plant biology.

The live plants that serve as the host trees 2 can be any living plant which is several years old, that forms a lignified bark, said bark being suitable for the the emplacement of epiphytes. Trunks or branches from living plants with lignified bark are suitable if the section that is cut out is amenable to root formation and generates new shoots and a new crown. Also suitable for host trees 2 are many plants that will remain alive even after their leaf crowns have been removed, cut back or thinned out. The growth of not only their leaf crowns, but also their roots can be regulated. They can be kept alive—shorn of their roots or left with only a small root ball—in relatively small planters, and sections of their trunks and branches put down roots very easily.

Experimentation in this area has shown that epiphytes can be arranged surprisingly easily and kept alive on host trees 2 that are never host trees for epiphytes in natural surroundings. Thus, for example, an orchid 1 originating from one part of the world can develop better on a host tree 2 from another part of the world that it can in its natural habitat. It also transpires that epiphytes from the Mediterranean area and the temperate zones can be paired with tropical epiphytes. This is indicated in FIGS. 3 and 5.

The potential of the process according to the present invention that apply to transportation can be derived from the above discusson. If the orchid 1 is rooted on a host tree 2 that has taken root in a planter, and is in a permanent biological union with it, (FIG. 4, FIG. 1) the orchid can be transported with the planter 3 with no difficulty. If transportation of the planter 3 is not desirable for any reason, the orchid 1 must be united permanently and biologically with a host tree 2 of which a small portion will remain alive during the move and which is amenable to rooting by the orchid. A large selection of such host trees 2 is available, as has already been mentioned. This possibility is illustrated in FIG. 6.

However, this process also presents the possibility of being able to move a previously created floral arrangement. In this case one must proceed so as to preserve the permanent biological union between the host tree 2 and the orchid, and only moves that portion of the host tree 2 that is necessary for the survival of the floral arrangement. This is contrary to the former practice, according to which the permanent biological union, the rooting, is destroyed by removing the orchid 1 from the host tree 2.

It needs no special mention that during cultivation, during creation of the floral arrangement, during preservation of the permanent biological union and during transportation, as in all other dealings with the orchid 1 and/or the host tree 2, one must proceed in the manner of a careful gardener. All methods, materials, and procedures that are used in the garden in the interests of the desired effect are to be used here. Selection and application of such procedures present no problem to the expert of average knowledge.

The large number of possibilities that are available for effecting the realisation of the invention can be measured by the large selection of epiphytes and their derivatives that is available, and the host trees 2 that are suitable. There are move than 100,000 tree-dwelling orchids and hybrids of such types and there are many thousand tree-dwelling bromelia, cacti and ferns. Of those other appropriate plants, in addition to philodendron, Ficus stipulata, symgonium, scindapsus, and hedera, the so-called hanging plants that originate from the most varied plant families can scarce be counted.

In the selection of living plants that form lignified barks there are five plant groups.

To the first belong woods having the same temperature requirements as tropial orchids, for example, ficus hibiscus, palms, codienum, acalypha, yuccaa types, dracaenae, pandanus, and the like. The second group comprises the evergreens such as laurel, thuya, taxus and the like. The stems of these plants can be completely defoliated so that only one leaf remains at the tip. The third group is made up of those trees that grow relatively fast, and includes bushes: euoenlymus, tamarix, jasminum, lonicera, salix, oleander, myrtle, coffea arabica, tea bush, citrus types. These plants root extremely well and thrive after being cut back. The fourth group includes, for example, European varieties such as oak, white beech, alder, lime, white poplar, elder, and sumac; these root in cold earth and in summer have high, relatively slim crowns and their relatively high trunks, several meters thick, are well suited for the emplacement of orchids. The fifth group is formed of dwarf ornamental plants with lignified bark: cordilynes, rhododendron, grevillea, and some succulent types of euphorbia.

Since the pairing possibilities permit several hundred thousand variations, only examples for which the host tree 1 is characteristic are cited below; this can be paired with one or several epiphytes, which is expedient from the standpoint of cultivating ornamental plants.

The types cited in the examples are given as examples and can be replaced by any other type within a group.

EXAMPLE 1

A 10-cm thick, 2-m section cut from a tree having the same temperature requirements as tropical orchids, Yucca elephantoides, was rooted in a planter of 20 liters capacity. Modern, large-bloom phalaenopsis hybrids at the four-leaf stagewith bare roots covered by moss were emplaced on this section prior to blooming, in a triangular arrangement and secured by silk thread. After sprouting the resulting blossom tendrils were secured to the stem at the required angle and in the desired direction by means of flexible hooks and cut off in full bloom. The superfluous shoots of the yucca were cut off and used as slips. In the fall, the superfluous leaves were removed and used as mulch. The uncovered areas on the stem of the yucca were used to rear tillandsia.

EXAMPLE 2

A 5-cm thick, 50-cm section of a rapidly growing bush, tamarix, was rooted in a soil-filled planter. Halfway up the section, oncidium papilio was rooted. After sprouting, the blossom tendrils grew. Ceropegia was allowed to shoot on the stem. The whole arrangement was used when in bloom.

EXAMPLE 3

A 10-cm thick pandanus tree, a tree with the same temperature requirements as tropical orchids, had its crown removed. The roots were cut back to 10 cm. The whole was re-rooted in a 40-liter planter and the new shoots thinned out. The host tree so obtained was overgrown with multicoloured leaved philodendron. Orchid types and hybrids from the vanda family were settled on the bark of the tree. When in bloom, the arrangement can be used to obtain cut flowers, or for display.

EXAMPLE 5

The root ball of a palm, i.e., a tree with the same temperature requirements as tropical orchids, was artificially confined in a crate. The crown was thinned out and the bare trunk was settled to a height of 1.50 m with orchids belonging to the Laelien family. For garden purposes, the plants can be used as collectors for the laelia types.

EXAMPLE 5

Three sections of jasmine trunk, i.e., sections of a fast growing bush, each 1.50 m long and 2 cm thick, were rooted in a 40-liter planter so that they were in contact with each other. Only at the upper extremities were several green branches left as a crown. At intervals of 20 cm from each other modern hybrids of dendrobium phalenopsis were settled on the stems and their roots filled the spaces between the three columns, where they were anchored. The arrangement was used for the continuous provision of cut blooms. In winter, the orchids were allowed to rest and the jasmine leaves to fall.

EXAMPLE 6

A 60-cm long, 3 cm thick section of dwarf willow i.e., of a fast-growing tree (salix), was rooted in a flower pot of 12 cm diameter. Zygopetalon crinitum was settled on the stem, together with adiantum fern. The arrangement was intended for sale.

EXAMPLE 7

A 3-cm thick, 1.50 m long branch of Lonicera, a fast-growing bush, is rooted and settled with arachnis orchids. The arrangement was used to provide cut flowers.

EXAMPLE 8

The 1-m high trunk of a dragon tree (dracaena), a tree with the same temperature requirements as orchids, was rooted with a root ball in a 20-cm diameter pot. The crown was shaped, the whole trunk set with types of rhipsalis and epephyllum. Scissus was used as a climber. The arrangement was intended for sale.

EXAMPLE 9

Six-cm high stem sections of Euphorbia, an ornamental plant with a lignified bark, were raised in a 20-cm pot and settled with Ionopsis paniculata orchids and Tillandsia cacticalo. The whole arrangement was used for marketing.

EXAMPLE 10

The 2-m high stem of a thuya, an evergreen tree, the roots and crown of which had been severely cut back, was settled with Bulbophylum orchids. The arrangement was intended for plant-lovers

EXAMPLE 11

A Taxus with cutback roots, i.e an evergreen tree, was raised in a container. The crown was left only on the top one-eighth of the long stem. The stem was settled with Doritaenopsis orchids. The arrangement was used to provide cut flowers.

EXAMPLE 12

After its roots and leaves had been thinned out, a 1-m high example of the coffee bush (Coffea arabica) with a trunk 4 cm in diameter, i.e., a fast-growing bush, was settled with 12 different sorts of dwarf orchid that bloomed at the same time as the coffee bush. The arrangement was sold in toto.

EXAMPLE 13

A lemon tree (Citrus), an evergreen tree, with cutback roots and ramified leaves was covered by Ficus stipulata. Odontoglossum and Stanhopes orchids were settled on the stem and the branches. The arrangement was sold in toto or displayed.

EXAMPLE 14

The crown of a dwarf orange (Citrus ichausa), a dwarf evergreen, was cut to shape and the tree raised in a #20 pot. Epidendrum orchids and dwarf bromelia (Neoreglia) were settled on the stem. The arrangement is suitable as a showwindow display.

EXAMPLE 15

A 0.3 m stem section of an evergreen bush, Euonymus, with cutback roots, cut crown and thinned shoots, was settled with Dendrobium nobile from the monsoom areas, or with related types. The arrangement was sold in toto when in bloom.

EXAMPLE 16

An example of the orchid Cattleopsis, which grows only on oaks (Quercus) was transferred with the branch on which it was situated by shoot grafting onto an oak that had been grown in a pot. Once the draft had grown, the arrangement could be moved.

EXAMPLE 17

An example of Araucaria, an evergreen, the roots and foliage of which had been cut, was settled in its habitat with Coryantes, a Central American orchid. The orchids were thus transportable, even though up to now it has proved impossible to keep them alive for protracted periods in temperate latitudes.

EXAMPLE 18

An example of myrtle, an evergreen bush, with cut roots and thinned out foliage, was raised in a container. Bollea, Colax and similar fine-blossomed orchids were settled on the lignate portions. The arrangement was sold in a transparent cylinder as a small indoor hot house.

EXAMPLE 19

Orchid types that are difficult to raise but which cultivate well, together with epiphytic bromelias and Tillandsia were settled on live bark of the evergreen laurel (Laurus). Climbing plants with multicoloured foliage were used as climbers. All the settled plants were used for shoot propagation. The shoots that were cut off were either raised on a live tree or set in a suitable substate and sold.

EXAMPLE 20

A Cochlioda orchid was set on the finger thick branch of an oleander bush, a fast-growing bush as soon as root formation began in a new shoot. After six months, when the roots of the orchid had grown around the branch, the oleander branch was cut off some 15 cm beneath the roots of the orchid and placed in water for two weeks, until a callous had formed on the oleander and the beginnings of roots could be seen. The branch together with the foliage was cut off 5 cm above the orchid at this time, and the lower end with the callous packed in wet cotton or wet plastic foam. The branch, together with the orchied that had grown firmly into place upon it, was transported. On arriving at its destination, the last 5 cm of the lower end of the oleander branch was set in an earth-filled flower pot. The crown grew and could be shaped as desired. The orchid that had grown firmly into place on the oleander had undamaged roots, grew, and flourished.

EXAMPLE 21

Small varieties of orchids with the same temperature requirements as the hibiscus and which bloom at different times were settled on the stem and branches of a hibiscus, a bush with the same temperature requirements as tropical orchids, which had been simply cut back; Tillandsie was also settled on it. The whole arrangement was sold as plant arrangement that blooms throughout the year.

EXAMPLE 22

The branches of a tall Buxbaum, an evergreen bush, were thinned out. Varieties of Vriesea, Guzmannia, Billberia, Neoregelia and Aechmea were settled on the branches. The arrangement can be sold as a plant grouping that produces blooms at any time, but also as a source of shoots for vegetative propagation of the settled multicolour leaved Bromelia.

EXAMPLE 23

Cattleya hybrids and original varieties were settled and allowed to grow on the bark of a thick-stemmed Ficus, a tree with the same temperature requirements as tropical orchids and which has a small crown. The arrangement can be used in gardening as a source for propagation materials.

EXAMPLE 24

Tall trees such as oak, white poplar, alder and red spruce were planted in the open at intervals of 2.5 m from each other (FIG. 3). In the rows of columns that resulted from the two rows of trees some 6 m high the bottom 11 of the hot house 8 was arranged at a height of some 40 cm, the roof 11 being installed at a height of 3 m. The crowns 5 extend above the hot house 8. The lower and the upper openings for the host tree 2 through the hot house 8 is thermally insulated by means of a flexible connection 12. The live bark of the tree within the hot house 8 is settled on a spiral line with hybrids of Cattleya to a height of 2.60 m in spring, when the roots are developing; the Cattleya are so selected that the timing, colour and quantity of the blooms are in keeping with local market demands. The area of the hot house 8 that is unobstructed between the trees can be used to cultivate floral arrangements that are set at a height of 50 cm and contain examples of small decorative trees, for example, Dizygotea, Codienum, Camelia, Fatshedera, Ilex, Machonia, Grevillea, epiphytes that are suitable for indoor use. These can be sold on average for 3-9 months after settling as blooming examples. The Cattleya hybrids that grow on the column trees serve as an on-going source for cut flowers.

The members of the arrangements described in the examples can be mixed and the selection can be extended with due consideration of aesthetic factors by various other pairings. The arrangement of the host trees 2 can also be varied in many ways. It is advantageous to set up rows of columns that are proportional to the height of the hot houses, and to make it possible to alter the distances between them. Thus the best possible interval from the standpoint of light utilisation and shadow formation can be arranged. This can then be varied, depending on the necessities of care and the use of the intervening spaces. Low columns or other plants can be alternated in the space between the higher columns.

I claim:

1. A combination of a floral arrangement and a hot house, wherein said floral arrangement comprises pre-cultivated epiphytes including orchids, hybrids, and intergeneric derivatives settled on the bark of a host tree such that said hot house surrounds said epiphytes, wherein an area of said tree is not surrounded by said hot house, said hot house surrounding the trunk of the tree in gripping relation such that at least the lower end of the trunk is outside the hot house.

2. A combination as in claim 1, wherein said area is both below and above said hot house, said hot house also surrounding an upper portion of the trunk of the tree in gripping relation such that the trunk of the tree passes entirely through the hot house.

3. A combination as in claim 2, in which there is a flexible connection between said hot house and said host tree in the region where a roof and a base of said hot house surrounds said tree.

4. A combination as in claim 1, wherein a plurality of said combination of trees and hot houses are arranged in rows such that small plants are arranged between said rows of trees.

* * * * *